Nov. 19, 1940.   H. PASSLER   2,222,442
BOREHOLE DIRECTION RECORDER
Filed April 21, 1939

INVENTOR
Hermann Passler
BY
his ATTORNEY.

Patented Nov. 19, 1940

2,222,442

UNITED STATES PATENT OFFICE 2,222,442

BOREHOLE DIRECTION RECORDER

Hermann Passler, Zistersdorf, Niederdonau, Germany, assignor of one-half to Albert Brunnbauer, Sen., Vienna, Germany Application April 21, 1939, Serial No. 269,309
In Germany December 5, 1938

3 Claims. (Cl. 33—205.5)

For determining the spacial position of boreholes, apparatuses were hitherto used which were lowered into the borehole and equipped with a pendulum and a compass, a source of light and a photographic camera, which photographically records the position of this pendulum and of the compass at predetermined intervals of time, so that the spacial position can be ascertained herefrom. These apparatuses do not operate reliably, because the source of light, the photographic camera and especially the negative material are very sensitive and easily lead to disturbances. A particular disadvantage of these apparatuses is also the necessary solid construction of the housing which must often withstand high hydrostatic pressure.

The invention relates to an apparatus for determining the spacial position of boreholes and which, as compared with the known apparatuses, is characterized by its strong construction, great reliability and especially by the fact that it enables a pressure-relieved and consequently relatively light and cheap housing to be used.

The apparatus according to the invention has an element orientated by a magnet with a scale on its surface according to the rhumb-card and according to the central distance, a pendulum suspended thereover on a Cardan joint, and means for determining the position on the surface of the magnetically orientated element opposite the end of the pendulum at a known time. The pendulum is preferably constructed as a tube, and the surface of the magnetically orientated element is coated with an adhesive substance, so that a steel ball liberated by a spring motor at predetermined intervals to drop, in falling through the pendulum, reaches the point opposite the end of the pendulum and there remains adhering, the magnet orientated element itself being oscillatably suspended and has the shape of a calotte of a radius equal to the length of the pendulum. This relatively strong apparatus enables the interior of the housing to be filled with a liquid so that, if it has holes in its wall or if a part of the wall of this housing is movable, the hydrostatic pressure in the borehole is transmitted to the liquid in the housing so that the housing proper is relieved of pressure.

An embodiment of the invention is illustrated by way of example in the accompanying drawing in which.

Figure 1:
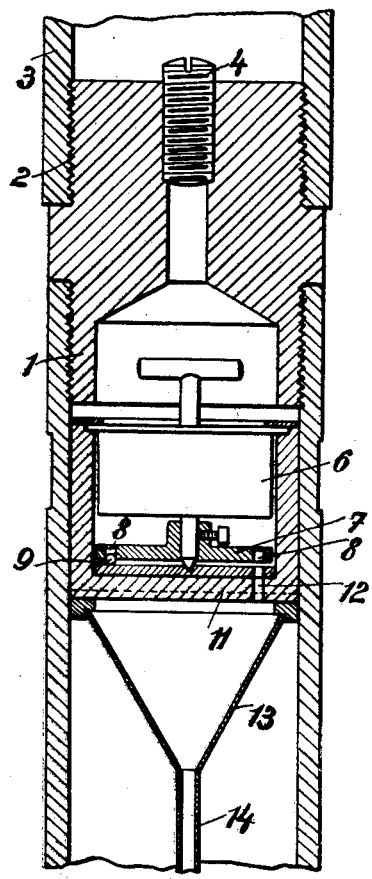
Fig. 1 shows the upper part of the apparatus in central longitudinal section.
Figure 2:
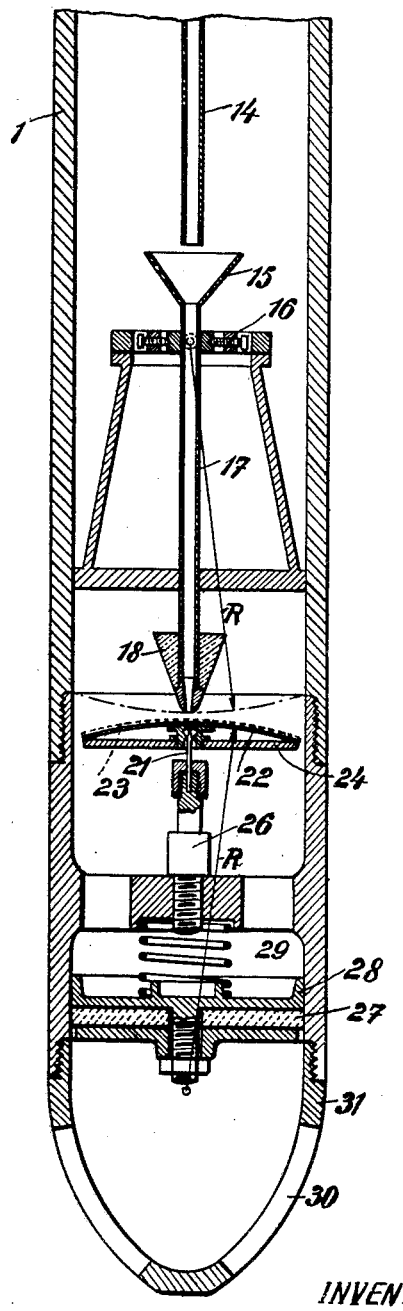
Fig. 2 is a similar view of the lower part of the apparatus.

The housing 1 of elongated, cylindrical shape is made of non-magnetic material such as bronze and has at its upper end an external screw thread 2 for connecting to a drilling rod string 3 or to a rope, by means of which the apparatus can be lowered into the borehole. 4 is a screw for closing a filling hole. A spring motor 6 is fitted in the upper end of the housing and drives a plate 7 which has on its periphery a relatively large number of bores 8 for accommodating small balls 9. A partition 11 in the housing below the plate 7 has a single bore 12 so that, as the plate 7 rotates, the balls in the holes 8 can drop successively through the bore 12.

A funnel 13 is fitted below the partition and conducts the falling balls into a tube 14. On reaching the end of this tube the balls drop into a funnel 15 of a tubular pendulum 17 suspended on a Cardan joint 16, which pendulum is weighted at its lower end by a lead weight 18 and acts like a plumb. A calotte-shaped plate 22 is mounted on a point 21. The upper surface of this plate 22 has a finely graduated scale like a rhumb-card (meridians) and also a scale indicating the central distance in the form of concentric circles (parallel circles) with indication of the angular distance from the central axis, and whose surface is coated with a waterproof adhesive 23. On the under side of this plate 22 a magnet rod 24 is fitted, so that the whole always adjusts itself in the north direction indicated on the surface and moreover swings out at every inclination owing to the point bearing, so that the central axis of the calotte is always in the vertical. The radius of the calotte is equal to the length of the pendulum.

In the lowermost part of the housing a support 26 for the element 22, 24 is fixed and thereunder a piston 28 provided with a rubber packing 27 is longitudinally shiftable in the housing and cushioned by a spring 29. The housing is closed at its lower end by a conically tapering cap 31 with apertures 30.

The apparatus operates in the following manner: Before the device is lowered into the borehole, a number of differently colored steel balls are inserted in the perforated plate 7 and the spring motor is wound and so set that, for example at intervals of five minutes, one of the bores accommodating a ball comes into register with the drop bore 12. The apparatus is then lowered and allowed to remain at the desired depth until a ball has dropped. The colored ball falls through the tubular pendulum on to the surface of the element 22 and sticks thereon. As the pendulum swings by an amount depending upon the inclination of the boreholes and the surface 22 is controlled according to direction, the scale on the surface 22 enables the inclination and direction of the borehole at the point in question to be read directly by the position of the ball. The point mounting of the calotte-shape of the element 22 presents the advantage that the distance between the lower end of the pendulum tube 17 and the surface 22 is the same at all angles of inclination because the surrounding surface of the oscillating calotte 22 is itself of calotte-shape with a radius of the same size but in the opposite direction.

It would also be possible to make the plate 22 in some different shape, for example flat and to mount it not oscillatable but only on a vertical axis, the parallel circle adjustment ought then, however, to be ascertained by gauging.

The upper portion of the housing containing the spring motor is filled with petroleum and the lower portion accommodating the pendulum apparatus with water or with some other liquid which is heavier than oil and does not affect the adhesive properties of the adhesive coating 23. The liquid at the same time acts in an advantageous manner as means for damping the oscillating elements.

The hydrostatic pressure in the borehole is transmitted to the liquid in the interior of the apparatus by the piston 28, so that the housing is relieved from pressure and can be made relatively thin-walled.

Instead of the device driven by spring motor and herein described an arrangement with electric control might be used which is actuated from above when the apparatus has reached the desired depth, this presenting the advantage that one is entirely independent in the choice of the intervals of time. Care must, however, be taken that the action of the magnet needle is not affected by the relay fitted in the device and effecting the dropping of the balls.

I claim:

1. A device for determining the orientation and inclination of boreholes to be lowered into the borehole, comprising in combination a magnet-orientated element having on its surface scales according to the rhumbcard and according to the central distance, a tubular Cardan-suspended pendulum arranged above said element, heavy bodies adapted to drop through said tubular pendulum on to said magnet-orientated element, a spring operated motive means for feeding said bodies to the tubular pendulum, a layer of adhesive material on the surface of said magnet-orientated element adapted to hold the heavy bodies in the position in which they fall on said element.

2. A device for determining the orientation and inclination of boreholes to be lowered into the borehole, comprising in combination a magnet-orientated element having on its surface scales according to the rhumbcard and according to the central distance, said element oscillatably mounted and having a callotte-shaped surface, a tubular Cardan-suspended pendulum of a length equal to the length of the radius of said calotte-shaped surface, heavy bodies adapted to drop through said tubular pendulum on to said magnet-orientated element, a spring motor adapted to determine the dropping time of said bodies, a layer of adhesive material on the surface of said magnet-orientated element adapted to hold the heavy bodies in the position in which they fall on said element.

3. A device for determining the orientation and inclination of boreholes and adapted to be lowered into the borehole, comprising in combination a magnet-orientated element having on its surface scales according to the rhumbcard and according to the central distance, said element oscillatably mounted and having a surface of calotte-shape, a tubular Cardan-suspended pendulum of a length equal to the length of the radius of said calotte-shaped surface, heavy bodies adapted to drop through said tubular pendulum on to said magnet-orientated element, a spring motor adapted to determine the dropping time of said bodies, a layer of adhesive material on the surface of said magnet-orientated element adapted to hold the heavy bodies in the position in which they fall on said element, a housing accommodating the whole device and having an aperture in its lower end, a piston mounted slidably in said housing and closing the said aperture said housing being filled with oil in the upper part and with an aqueous liquid in the lower part said piston adapted to transmit the hydrostatic pressure prevailing in the borehole to the liquid in said housing.

HERMANN PASSLER.